United States Patent [19]
Roberts et al.

[11] Patent Number: 5,515,227
[45] Date of Patent: May 7, 1996

[54] FAULT IDENTIFICATION SYSTEM FOR USE IN PROTECTIVE RELAYS FOR POWER TRANSMISSION LINES

[75] Inventors: Jeffrey B. Roberts, Moscow, Id.; Edmund O. Schweitzer, III, Pullman, Wash.

[73] Assignee: Schweitzer Engineering Laboratories Inc., Pullman, Wash.

[21] Appl. No.: 492,890

[22] Filed: Jun. 20, 1995

Related U.S. Application Data

[63] Continuation of Ser. No. 962,297, Oct. 16, 1992, abandoned.
[51] Int. Cl.$^6$ .................................................. H02H 3/26
[52] U.S. Cl. .............................. 361/67; 361/78; 324/525
[58] Field of Search .................... 361/76, 79, 80, 361/85, 87; 324/521, 522, 525, 528, 555

[56] References Cited

U.S. PATENT DOCUMENTS 4,795,983   1/1989   Crockett et al. ........................ 324/521

*Primary Examiner*—Brian K. Young
*Assistant Examiner*—Sally C. Medley
*Attorney, Agent, or Firm*—Jensen & Puntigam

[57] ABSTRACT

The angle between the negative sequence and zero sequence currents for a power signal on a transmission line is measured and compared against a plurality of successive angle ranges from 0° to 360°. If the angle is 0°±30°, an AG fault is indicated and a first section output is produced blocking ground elements BG and CG and phase-to-phase elements AB and CA. An angle of 120°±30° indicates a BG fault, resulting in a second output blocking ground elements AG and CG and phase-to-phase elements AB and BC, while a phase angle of 240°±30° indicates a CG fault, resulting in a third output blocking ground elements AG and BG and phase-to-phase elements BC and CA. If the phase angle is not covered by the above three primary ranges, then a second stage of comparisons are made, including determining the magnitudes of the phase-to-phase distance elements, and then comparing the phase-to-phase resistance of the lowest of those with the apparent resistance of the one ground element, i.e. AG, BG or CG, associated with the non-primary (secondary) range of angles which includes the measured phase angle. If selected criteria are met, then an output is asserted to block the ground and phase-to-phase elements noted above associated with that ground element.

9 Claims, 3 Drawing Sheets

FIG. 1A
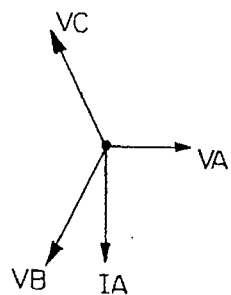
FIG. 1C
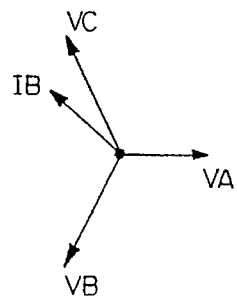
FIG. 1E
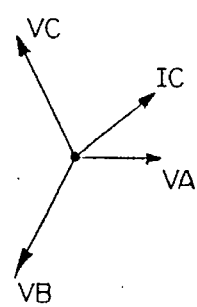
FIG. 1B
Aφ GROUND
$I_0 \ I_2$
FIG. 1D
Bφ GROUND 120°
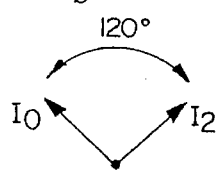
$I_0 \quad I_2$
FIG. 1F
Cφ GROUND 120°
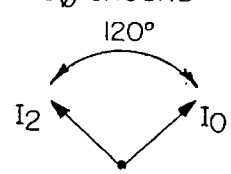
$I_2 \quad I_0$
FIG. 2A
Aφ GROUND
$I_0 \ I_2$
FIG. 2B
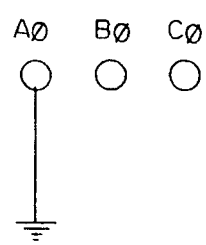
FIG. 2C
Aφ　Bφ　Cφ
FIG. 2D
BC-GROUND
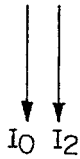
$I_0 \ I_2$
FIG. 2E
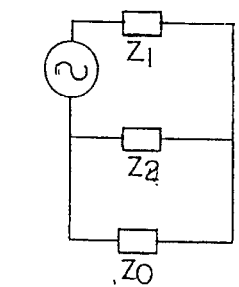
FIG. 2F
Aφ　Bφ　Cφ

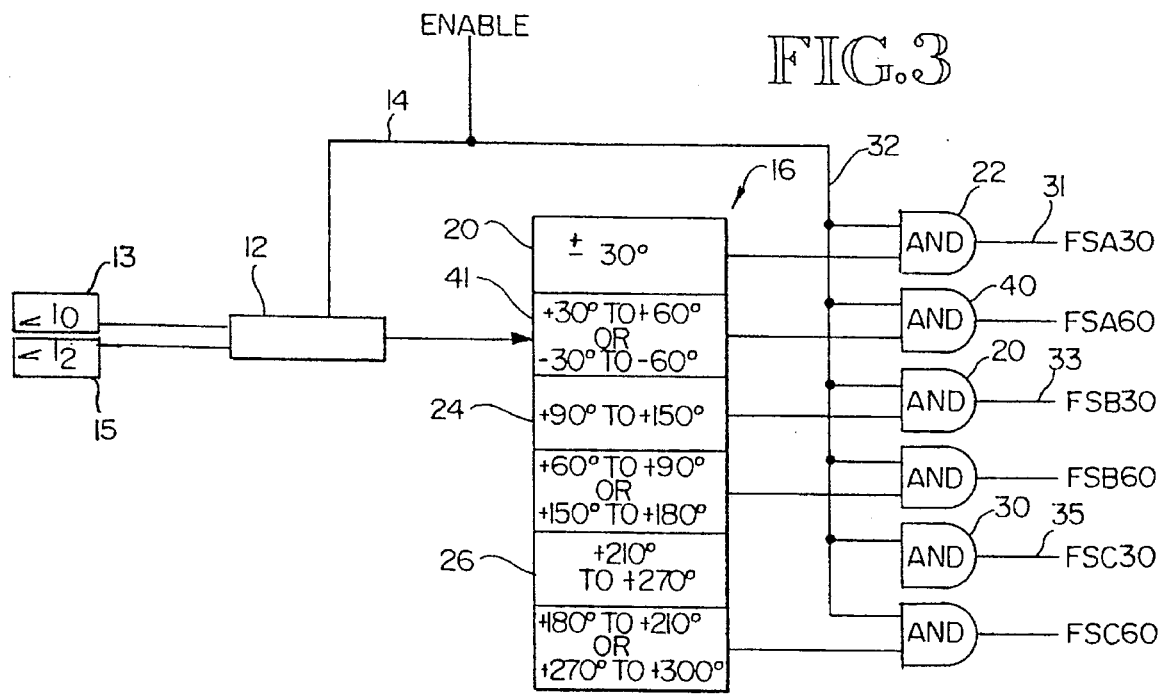
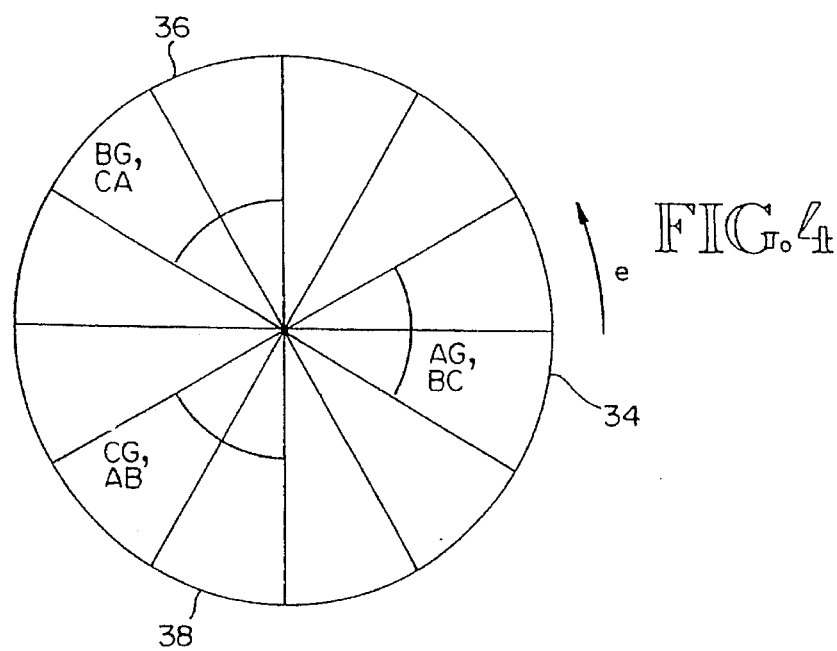

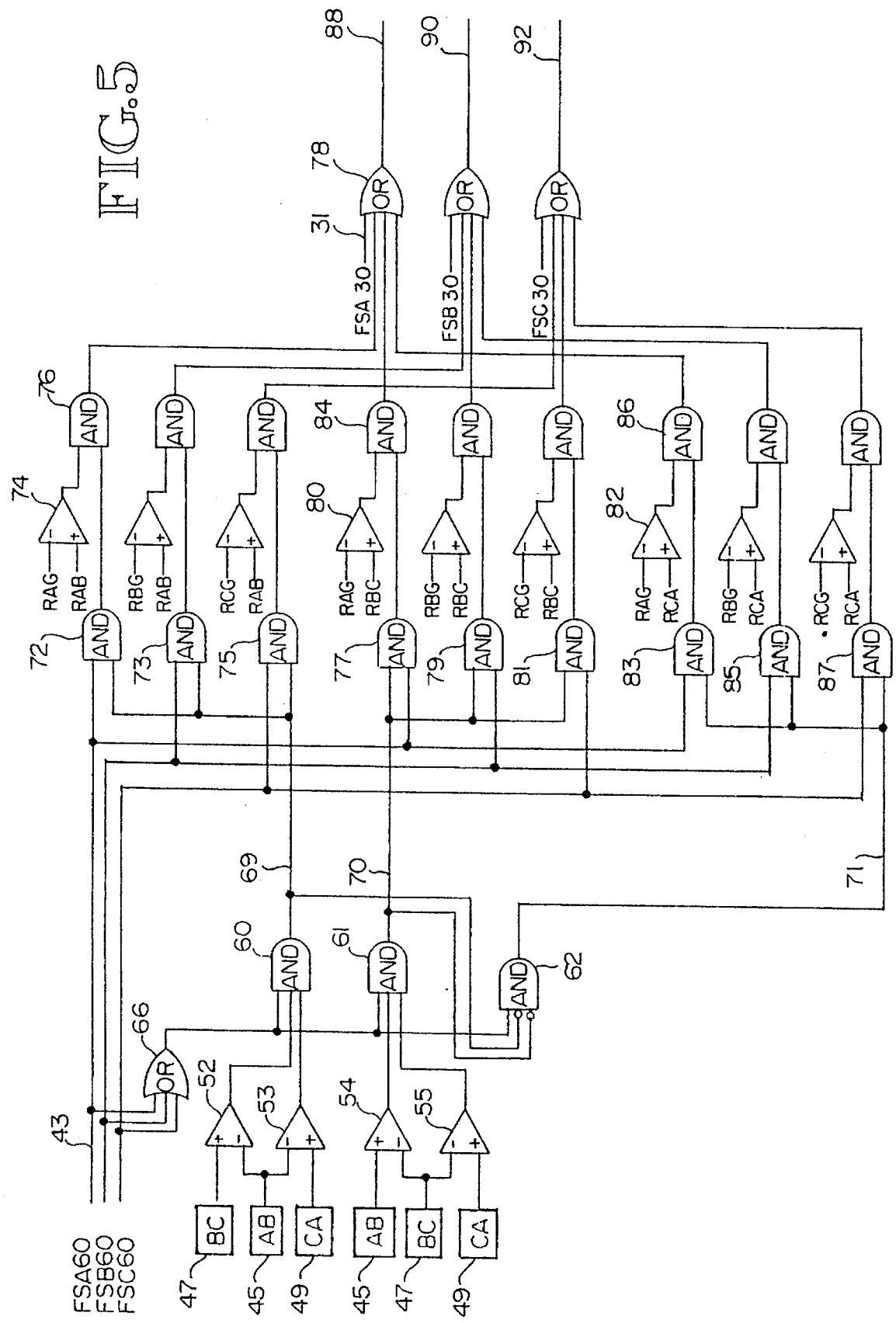

FAULT IDENTIFICATION SYSTEM FOR USE IN PROTECTIVE RELAYS FOR POWER TRANSMISSION LINES

This is a continuation of application Ser. No. 07/962,297, filed on Oct. 16, 1992, now abandoned.

TECHNICAL FIELD

This invention relates generally to the determination of faults on a power transmission line by distance type relays and more particularly concerns a system which is part of a distance relay for distinguishing between various types of faults on the power transmission line.

BACKGROUND OF THE INVENTION

In the protection of power transmission lines with distance relay elements, which recognize fault conditions on the transmission line, it has always been important to distinguish between various types of faults. Generally, this involves distinguishing between phase-to-ground faults for the three phase lines (A, B and C) of the power signal, and phase-to-phase-to-ground faults involving any two of the phase lines. This is important because of two significant problems in recognizing fault conditions with distance relays.

First, it is necessary to block selected ones of the ground distance elements when there is a phase-phase-ground fault, because one or more of the ground distance elements associated with the actual phase-phase-ground fault can undesirably overreach into an adjoining protected section of the line, which is undesirable because it could result in a false tripping of a circuit breaker which is not responsible for clearing the phase-phase-ground fault. Which particular ground distance element will overreach depends upon the location of the fault resistance, in particular whether the fault resistance is between two phase lines or from a phase pair to ground.

The second problem occurs in certain applications where there is a strong power source behind (upstream of) the relay location. In such a case, a close-in, single-line-to-ground fault in the forward direction can result in one or more of the phase-phase distance elements incorrectly asserting. In certain systems, single pole tripping is desired (where only a particular faulted phase line is interrupted), but the assertion of a phase-phase distance element will result in breakers opening for all three phases. In such a case, an undesired three pole trip thus may occur where only a single pole trip was necessary and desired. This problem is generally referred to as single pole security.

Existing fault identification systems in distance relays typically make use of the phase angle difference between the negative sequence and zero sequence currents for the power signal in their determinations. These systems divide the 360° total phase angle range into three equal sectors, 60°–180°, 180°–300° and 300°–60° (through 0°). Different ground and phase-phase elements are blocked from operating, depending upon which of the three sectors the phase angle difference between the negative sequence and zero sequence currents is in. However, it has been found that such systems do not provide satisfactory accuracy, i.e. security, in many situations, particularly as the phase angle difference comes reasonably close to the boundary line between adjacent sectors. Inaccurate fault identification occurs, and wrong distance elements are blocked and distance elements which should be blocked are left unblocked. Hence, a more secure and dependable system for identifying faults in distance relays is desirable.

SUMMARY OF THE INVENTION

Accordingly, the present invention includes a system for distinguishing between faults in a power transmission line, the system including phase-to-ground distance elements AG, BG and CG and phase-to-phase distance elements AB, BC and CA, comprising: means for determining negative-sequence current and zero-sequence current for a three phase power signal on a power transmission line; means for determining the phase angle difference between said negative-sequence current and said zero-sequence current; means for blocking selected distance elements if the phase angle difference is within one of a plurality of primary ranges of angles; means for comparing a selected resistance value of a phase-to-ground distance element with a selected resistance value of a predetermined one of the phase-to-phase elements; and means for blocking said distance elements if the phase angle difference is within the range of one of a plurality of secondary ranges other than said primary ranges and if the selected resistance value of a phase-to-ground distance element associated with the secondary range has a selected relationship to the selected resistance value of the predetermined phase-to-phase element.

DESCRIPTION OF THE DRAWINGS

FIGS. 1A through 1F show phasor and phase angle relationship of negative sequence and zero sequence currents for A-ground, B-ground and C-ground faults, respectively.

FIGS. 2A through 2F show the phase angle relationships of negative sequence and zero sequence currents and other characteristics for A-ground and BC-ground faults.

FIG. 3 is a block diagram of a first stage of the system of the present invention.

FIG. 4 is a diagram showing the phase angle difference pattern of the system of the present invention FIG. 5 is a block diagram showing a second stage of the system of the present invention.

BEST MODE FOR CARRYING OUT THE INVENTION

A power transmission line system typically carries a three phase power signal, the individual phases referred to as A, B and C. The present invention uses certain symmetrical component quantities, specifically positive-sequence, negative-sequence and zero-sequence voltages and currents to distinguish between certain types of faults which may occur on the transmission line. A typical distance relay will include phase A-to-ground (AG), phase B-to-ground (BG) and phase C-to-ground (CG) ground distance elements which recognize single-line-to-ground faults. The relay will also typically include phase A—phase B (AB), phase B—phase C (BC) and phase C—phase A (CA) phase-to-phase distance elements. In fault identification, it is important to identify certain types of faults so that the distance elements which should not assert, but which may, in fact, assert, in certain fault circumstances, can be blocked from asserting. In one example, for a phase A-to-ground (AG) fault, phase-to-phase distance elements AB and CA may assert (in addition to the AG ground distance element), which results in a risk of a three pole trip, when a three pole trip is not necessary. This is undesirable in many applications. In another example, for a BC-to-ground (BCG) fault, ground distance elements BG and CG may overreach and assert for a fault in a remote zone of protection farther down the line. This may result in a false trip for the remote zone, which again is undesirable. Ground distance elements BG and CG thus should be blocked, as well as phase-to-phase elements associated with AB and CA.

FIG. 1 shows the relationship between voltages and currents and between $I_2$ (negative sequence current) and $I_0$ (zero sequence current) for AG, BG and CG single-line-to-ground faults, respectively. In an AG fault, the negative-sequence and zero-sequence currents are in phase, while for a BG fault, the negative-sequence current lags the zero sequence current by 120°, and for a CG fault, the negative sequence current leads the zero sequence current by 120°. The phase angle relationships shown in FIG. 1 are also true for certain phase-phase-ground relationships in the situation where there is no fault resistance. FIG. 2 shows such an example for an AG fault and a BCG fault (they are identical). A similar relationship is true for BG and CAG faults and for CG and ABG faults. Hence, for an AG ground fault, phase-phase distance element BC is not blocked, while for a BG fault, phase-phase distance element CA is not blocked, and for a CG fault, phase-phase distance element AB is not blocked.

The identification of fault types in the present invention also uses the phase angle difference between the negative-sequence and zero-sequence currents, but in a substantially different manner. In previous systems, as explained above, a fault was determined to be AG if the phase angle difference was 300°–60° (through 0°), BG if the phase angle difference was 60°–180°, and CG if the phase angle difference was 180°–300°. As indicated above, however, this three sector approach has been discovered to be not sufficiently dependable.

The system of the present invention uses a two stage evaluation process for fault determination. Referring to FIGS. 3 and 4, the phase angle difference between the negative-sequence current $I_2$ and the zero-sequence current $I_0$ is determined by a comparator 12. Means for determining the negative sequence current and positive sequence current and the phase angles therefore are shown representationally at 13 and 15 in FIG. 3. The comparator 12 is subject to an enable signal on input line 14, by one or more supervisory systems, which examine the negative-sequence and zero-sequence currents to determine whether or not they meet selected thresholds. This insures reliability in operation. For example, the zero-sequence current is examined to insure that it meets a threshold value relative to the negative-sequence current, and the residual current ($I_r$) is examined to insure that it is larger than a selected fraction (e.g. 0.1) of the maximum phase-to-phase current. Such supervisory security functions are, however, conventional, and are thus not disclosed herein in detail, except to note that phase angle comparator 12 is typically under the supervision of an enable signal on line 14.

The phase angle difference from comparator 12 is applied to an angle range determining element 16, which determines the appropriate one of six different ranges which covers the particular phase angle difference from comparator 12. If the phase angle is within a range 20 of 0°±30°, an output is applied to AND gate 22. Likewise, if the phase angle difference is within a range 24 of 90°±30° or a range 26 of 210°±30°, outputs are provided to AND gates 28 and 30, respectively. The other inputs to AND gates 22, 28 and 30 are the enable signal on enable line 32. The enable signal on line 32 is the same enable signal as on line 14. The outputs of AND gates 22, 28 and 30 are referred to as FSA 30, FSB 30 and FSC 30, respectively, and are applied directly to the output portion of the second stage of the fault identification system, shown in FIG. 5 and discussed below.

In the system of the present invention, an FSA 30 signal on line 31 conclusively indicates an AG fault, an FSB 30 signal on line 33 conclusively indicates a BG fault, and an FSC signal on line 35 conclusively indicates a CG fault. No additional testing is done if the phase angle difference is in one of the above-described ranges, shown as pie-shaped areas 34, 36 and 38 in FIG. 4.

If the phase angle difference from comparator 12 is not in one of ranges 20, 24 or 26 in FIG. 3 (sectors 34, 36 or 38 in FIG. 4), then an additional evaluation is made to determine accurately the particular fault. FIG. 5 shows an additional stage of the system of the present invention which accomplishes the additional evaluation. The additional stage will be explained with respect to phase A and an FSA 60 phase angle difference (FIG. 3) only. However, the same function and structural principles also apply with respect to phase B and FSB and phase C and FSC ranges. Referring to FIG. 3, if the phase angle difference range element 16 determines the phase angle difference to be within a range 41 of +30° to +60° or –30° to –60°, an output is applied to AND gate 40, the other input to which is the enable signal on line 32. The output of AND gate 40 is on line 43, designated FSA 60. The FSA 60 output on line 43 is applied to the circuit shown in FIG. 5 (on continuing line 43).

In the second stage of the system of the present invention, the "magnitude" of each phase-phase distance element (AB, BC, CA) is first determined, i.e. the distance between the fault and the relay as determined by each such distance element. Distance elements AB, BC and CA are shown representationally as elements 45, 47, and 49 in FIG. 5. This quantity can be obtained by torque measurements, overcurrent, or other methods. The smallest of these three distance values is determined. This is accomplished by comparators 52 through 55 and AND gates 60 through 62 in the circuit of FIG. 5. AND gates 60 through 62 are initially enabled by a signal from OR gate 66, to which is applied the FSA 60, FSB 60 and FSC 60 input lines. When there is an FSA 60, FSB 60 or FSC 60 signal, the resulting high output from OR gate 66 is applied to the AND gates.

Comparators 52 and 53 and AND gate 60 determine whether the magnitude of distance element AB is smaller than that of both BC and CA. If AB is smaller than BC and CA, the output of comparators 52 and 53 are both high and the output of AND gate 60 is high. Comparators 54 and 55 and AND gate 61 determine whether BC is smaller than both AB and CA. If BC is smaller than AB and CA, the outputs of comparators 55 and 56 are both high, and hence, the output of AND gate 61 is high. Lastly, if neither AND gate 60 nor AND gate 61 are high, this indicates that CA in fact has the smallest magnitude. The not lines from AND gates 60 and 61 will in such a case both be high at the input to AND gate 61 and the output of AND gate 62 is thus high. Other methods could of course be used to determine the smallest magnitude between AB, BC and CA.

If the distance element AB is the smallest, the high output from AND gate 60 is applied on line 69 to AND gates 72, 73 and 75. If distance element BC is the smallest, the high output from AND gate 61 is applied on line 70 to AND gates 77, 79 and 81, while if distance element CA is the smallest, the high output from AND gate 62 on line 71 is applied to AND gates 83, 85 and 87. In the next step in the second stage of FIG. 5, the apparent phase-to-ground resistance of the one enabled line (FSA 60, FSB 60 or FSC 60) from the first-stage range evaluation is compared with the phase-to-phase resistance of the phase-phase distance element identified above, i.e. the phase-phase distance element which has the lowest magnitude. Since the example described herein is for FSA 60, line 43 in FIG. 5 is high. This signal is applied to AND gates 72, 77 and 83. One of these AND gates (72, 77, 83) is enabled (depending on the outputs of AND gates 60, 61 and 62) and the resulting high output thereof is applied to one of AND gates 76, 84 or 86.

Comparator 74 compares the magnitude of the apparent resistance (RAG) of ground element AG with the magnitude of the phase-to-phase resistance (RAB) of element AB, if AB has the smallest magnitude of the three phase-phase distance elements. The output of comparator 74 goes high if RAG is smaller than RAB; this high output is applied to AND gate 76. The output of AND gate 76 thus goes high and is applied as one input to output OR gate 78. The same analysis is true for comparator 80, when BC has the smallest magnitude of the three distance elements and for comparator 82 when CA has the smallest magnitude.

In each of those cases, a high output is applied to OR gate 78 if the magnitude of RAG is smaller than RBC and RCA, respectively. Also applied to OR gate 78 is the FSA 30 signal on line 31 from FIG. 3. Under each of the above conditions, including a direct output from FSA 30, or in the event of an output from FSA 60 and a high output from AND gates 76 or 84 or 86, an output on FSA line 88 occurs, producing the particular distance element blocking effect described above, i.e. ground elements BG and CG are blocked as well as phase-phase elements AB and CA. Similar results are obtained for FSB and FSC calculations.

As indicated above, the second stage requires the calculation of certain resistance values. The resistances are determined as follows:

$$RAG = \frac{Im[V_a([I_a + k_{01} \cdot I_r] \cdot 1/Z_{1L})^*]}{Im[3/2(I_{a2} + I_0) \cdot ([I_a + k_{01} \cdot I_r] \cdot 1/Z_{1L})^*]}$$

$$RBG = \frac{Im[V_b([I_b + k_{01} \cdot I_r] \cdot 1/Z_{1L})^*]}{Im[3/2(I_{b2} + I_0) \cdot ([I_b + k_{01} \cdot I_r] \cdot 1/Z_{1L})^*]}$$

$$RCG = \frac{Im[V_c([I_c + k_{01} \cdot I_r] \cdot 1/Z_{1L})^*]}{Im[3/2(I_{c2} + I_0) \cdot ([I_c + k_{01} \cdot I_r] \cdot 1/Z_{1L})^*]}$$

$$RAB = \frac{Im[V_{ab} \cdot (I_{ab} \cdot 1/Z_{1L})^*]}{Im[(j2 \cdot \sqrt{3} \cdot I_{c2}) \cdot (I_{ab} \cdot 1/Z_{1L})^*]}$$

$$RBC = \frac{Im[V_{bc} \cdot (I_{bc} \cdot 1/Z_{1L})^*]}{Im[(j2 \cdot \sqrt{3} \cdot I_{a2}) \cdot (I_{bc} \cdot 1/Z_{1L})^*]}$$

$$RCA = \frac{Im[V_{ca} \cdot (I_{ca} \cdot 1/Z_{1L})^*]}{Im[(j2 \cdot \sqrt{3} \cdot I_{b2}) \cdot (I_{ca} \cdot 1/Z_{1L})^*]}$$

In the above equation, Im is the imaginary component, * denotes the complex conjugate, $I_r$=residual current =$3I_o$, $I_{ab}=I_a-I_b$, $I_{bc}=I_b-I_c$, $I_{ca}=I_c-I_a$, $V_{ab}=V_a-V_b$, $V_{bc}=V_b-V_c$ and $V_{ca}=V_c-V_a$, $V_a$, $V_b$, $V_b$=A phase, B phase and C phase line—neutral voltages, respectively, $I_a$, $I_b$, $I_c$=A phase, B phase and C phase currents, $1\angle Z_{1L} = 1$ ohm at the transmission line positive-sequence line angle, and $K_{01}$=zero-sequence compensation factor, from the relay setting. Further, $I_{a2}=\frac{1}{3}(I_a+a^2I_b+aI_c)$, $I_{b2}=aI_{a2}$, and $I_{c2}=a^2I_{a2}$.

Thus, the fault identification system of the present invention produces an output on line 88, referred to as an FSA output, and outputs on lines 90 and 92 for FSB and FSC outputs, respectively. The outputs on each of those lines results in blocking signals for selected ground elements, as well as selected phase-phase elements, depending on the phase angle difference of the negative-sequence and zero-sequence currents, as discussed above. The blocking signals on lines 88, 90 and 92 are applied back to the selected phase-ground elements and phase-phase elements to prevent them from asserting. The invention includes a two-stage process, involving comparing the measured phase angle difference with a series of ranges to produce a conclusionary result if the phase angle difference is within selected ranges and also performing additional evaluation, if the phase angle difference is within the other ranges. A secure, dependable identification of faults results from the two-stage process.

Although a preferred embodiment has been disclosed for purposes of illustration, it should be understood that various changes, modifications and substitutions may be made to the preferred embodiment without departing from the spirit of the invention which is defined by the claims which follow.

We claim:

1. A system for distinguishing between faults on a power transmission line, in a protective relay which includes phase-to-ground distance elements AG, BG and CG and phase-to-phase distance elements AB, BC and CA, comprising:

means for determining the phase angle difference between negative sequence current and zero sequence current for a three phase power signal on a power transmission line;

means for blocking selected distance elements from asserting if the phase angle difference is within one of a plurality of primary ranges of difference angles, wherein said plurality of primary ranges of difference angles are separated, respectively, by successive secondary ranges of difference angles and wherein the primary ranges of difference angles and the secondary ranges of difference angles cover 360°;

means for comparing, when the determined difference angle is within a secondary range, a first selected resistance value associated with the particular difference angle produced by action of the determining means, with a second selected resistance value of a predetermined one of the phase-to-phase elements; and means for blocking selected distance elements from asserting if the determined difference angle is within one of said secondary ranges and if said first selective resistance value has a predetermined relationship to the second selected resistance value.

2. A system of claim 1, wherein the first selected resistance value is an apparent phase-to-ground resistance and wherein the second selected resistance value is the phase-to-phase resistance.

3. A system of claim 2, wherein the blocked distance elements include selected phase-to-ground distance elements and selected phase-to-phase distance elements.

4. A system of claim 2, wherein for a phase angle difference in a first secondary range of 30° to 60° and −30° to −60°, distance elements BG and CG and distance elements AB and CA are blocked if the apparent resistance of A phase-to-ground is less than the phase-to-phase resistance of the predetermined phase-to-phase element, wherein for a phase angle difference in a second secondary range of 60° to 90° and 150° to 180°, distance elements AG and CG and distance elements AB and BC are blocked if the apparent resistance of B phase-to-ground is less than the phase-to-phase resistance of the predetermined phase-to-phase element and wherein for a phase angle difference in a third secondary range of 180° to 210° and 270° to 300°, distance elements AG and BG are blocked and distance elements BC and CA are blocked if the apparent resistance of C phase-to-ground is less than the phase-to-phase resistance of the predetermined phase-to-phase element.

5. A system of claim 1, wherein the predetermined one of the phase-to-phase elements is the phase-to-phase element having the smallest magnitude.

6. A system of claim 5, wherein the selected relationship is a lower absolute value.

7. A system of claim 1, wherein the primary ranges are 0°±30°, 120°±30°, and 240°±30°.

8. A system of claim 7, wherein the secondary ranges are 30° to 60° and −30° to −60°, 60°–90° and 150° to 180°, and 180°–210° and 270° to 300°.

9. A system of claim 7, wherein for a phase angle difference in the primary range of 0°±30°, distance elements BG and CA and distance elements AB and CA are blocked, wherein for a phase angle difference in the primary range of 120°±30°, distance elements AG and CG and distance elements AB and BC are blocked, and wherein for a phase angle difference of 240°±30°, distance elements AG and CG and distance elements BC and CA are blocked.

* * * * *